(12) United States Patent
Kim

(10) Patent No.: US 9,590,280 B2
(45) Date of Patent: Mar. 7, 2017

(54) BATTERY PACK

(71) Applicant: SAMSUNG SDI CO., LTD., Yongin-si, Gyeonggi-do (KR)

(72) Inventor: Myung-Chul Kim, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 173 days.

(21) Appl. No.: 14/467,124

(22) Filed: Aug. 25, 2014

(65) Prior Publication Data

US 2015/0064522 A1    Mar. 5, 2015

(30) Foreign Application Priority Data

Aug. 29, 2013 (KR) ........................ 10-2013-0103149

(51) Int. Cl.
*H01M 10/613* (2014.01)
*H01M 2/10* (2006.01)
*H01M 10/625* (2014.01)
*H01M 10/6556* (2014.01)

(52) U.S. Cl.
CPC ....... *H01M 10/613* (2015.04); *H01M 2/1077* (2013.01); *H01M 10/625* (2015.04); *H01M 10/6556* (2015.04)

(58) Field of Classification Search
None
See application file for complete search history.

(56) References Cited

U.S. PATENT DOCUMENTS

| 2008/0057392 A1 | 3/2008 | Takamatsu et al. |
| 2008/0196240 A1* | 8/2008 | Lin .................... H01M 2/1061 29/623.2 |
| 2009/0197154 A1 | 8/2009 | Takasaki et al. |
| 2010/0073005 A1 | 3/2010 | Yano et al. |
| 2011/0111282 A1 | 5/2011 | Nagamine et al. |
| 2011/0212355 A1 | 9/2011 | Essinger et al. |
| 2012/0122008 A1 | 5/2012 | Ko et al. |
| 2012/0224326 A1 | 9/2012 | Kohlberger et al. |
| 2013/0108918 A1* | 5/2013 | Kambayashi ......... H01M 2/365 429/185 |

FOREIGN PATENT DOCUMENTS

| CN | 101584059 A | 11/2009 |
| DE | 10-2011-082562 A1 | 3/2013 |
| EP | 2597700 A1 | 5/2013 |
| KR | 1998-021898 U | 7/1998 |
| KR | 2000-0015883 U | 8/2000 |
| KR | 10-2012-0053270 A | 5/2012 |
| WO | WO-2005/043650 A2 | 5/2005 |
| WO | WO-2012/133709 A1 | 10/2012 |
| WO | WO-2013/077176 A1 | 5/2013 |

OTHER PUBLICATIONS

European Search Report dated Nov. 20, 2014.

* cited by examiner

*Primary Examiner* — Miriam Stagg
*Assistant Examiner* — Carmen Lyles-Irving
(74) *Attorney, Agent, or Firm* — Lee & Morse, P.C.

(57) ABSTRACT

A battery pack includes a plurality of bare cells electrically connected to one another and a housing that accommodates the bare cells therein. The housing includes a frame portion and a pair of side portions respectively connected to one end and the other end of the frame portion. The housing includes a guide portion to guide a flow of fluid, the guide portion being located where the one end of the frame portion and one side portion of the pair of side portions are adjacent to each other.

19 Claims, 7 Drawing Sheets

BATTERY PACK

CROSS-REFERENCE TO RELATED APPLICATION

Korean Patent Application No. 10-2013-0103149, filed on Aug. 29, 2013, in the Korean Intellectual Property Office, and entitled: "Battery Pack," is incorporated by reference herein in its entirety.

BACKGROUND

1. Field

Embodiments relate to a battery pack.

2. Description of the Related Art

A high-power battery module using a non-aqueous electrolyte with high energy density has recently been developed. The high-power battery module is configured as a large-capacity battery module manufactured by connecting a plurality of battery cells in series so as to be used in driving motors of devices requiring high power, e.g., electric vehicles and the like.

A battery pack is formed by accommodating one or more battery modules in a housing.

The battery pack may be used as a power source for an external device. In this case, bare cells constituting the battery module may be secondary batteries including a lithium compound, and which can be reversibly charged/discharged.

SUMMARY

Embodiments are directed to a battery pack including a plurality of bare cells electrically connected to one another, and a housing that accommodates the bare cells therein. The housing includes a frame portion and a pair of side portions respectively connected to one end and the other end of the frame portion. The housing includes a guide portion to guide a flow of fluid, the guide portion being located where the one end of the frame portion and one side portion of the pair of side portions are adjacent to each other.

The guide portion may include a groove portion that is inwardly recessed.

The frame portion may include a pair of first frames that face each other in a first direction, and a second frame that connects bottoms of the pair of first frames. The side portions may face each other in a second direction perpendicular to the first direction at the one end and the other end of the frame portion.

A section of the frame portion along the first direction may be in a form of a U shape.

The one side portion may include a base portion that vertically contacts the one end of the frame portion and a flange portion that protrudes toward the frame portion from the base portion.

The flange portion may be inwardly spaced from an end of the base portion by a first distance.

The first distance may correspond to a thickness of the frame portion.

The flange portion may be insertably coupled to an inside of the frame portion to overlap with the frame portion. The guide portion may be located where the side portion and the frame portion overlap with each other.

The flange portion may include a first fastening portion. The frame portion may include a second fastening portion fastened to the first fastening portion.

The guide portion may be located in the flange portion adjacent to the one end of the frame portion.

The flange portion may include first and second flanges that respectively contact the first frames and the second frame. The guide portion may extend to the second flange at a lower portion of the first flange. At least one end of the guide portion may be sloped.

A first end portion of the guide portion may be located at the first flange and a second end portion of the guide portion may be located at the second flange. The first end portion of the guide portion and the second end portion of the guide portion may extend to each other. The guide portion may be inwardly recessed from an outer surface of the first flange. A section of the guide portion perpendicular to the first end portion of the guide portion may slope inwardly from the outer surface of the first flange.

The first end portion may be in a form of a diagonal surface having an angle of less than 90 degrees counterclockwise with respect to the base portion.

The base portion of the one side portion may further includes a groove portion that contacts the second frame. The base portion where the groove portion is located may have a thickness less than that of a peripheral portion of the base portion such that the base portion where the groove portion is located is spaced apart from the second frame.

The groove portion may be connected to the guide portion.

The second frame may further include a stepped portion located at an end portion thereof, the stepped portion of the second frame being stepped inwardly from a peripheral portion of the second frame, the stepped portion of the second frame corresponding to the groove portion of the base portion of the side portion.

At least one support portion may overlap an outer surface of the second frame at a bottom end of the base portion. The second frame may be inserted between the flange portion and the support portion.

The support portion may include two support portions that are spaced apart from each other, relative to the center of the second frame. The housing may further include a bottom guide portion between the two support portions.

The frame portion may be made of stainless steel. The side portions may be made of plastic.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
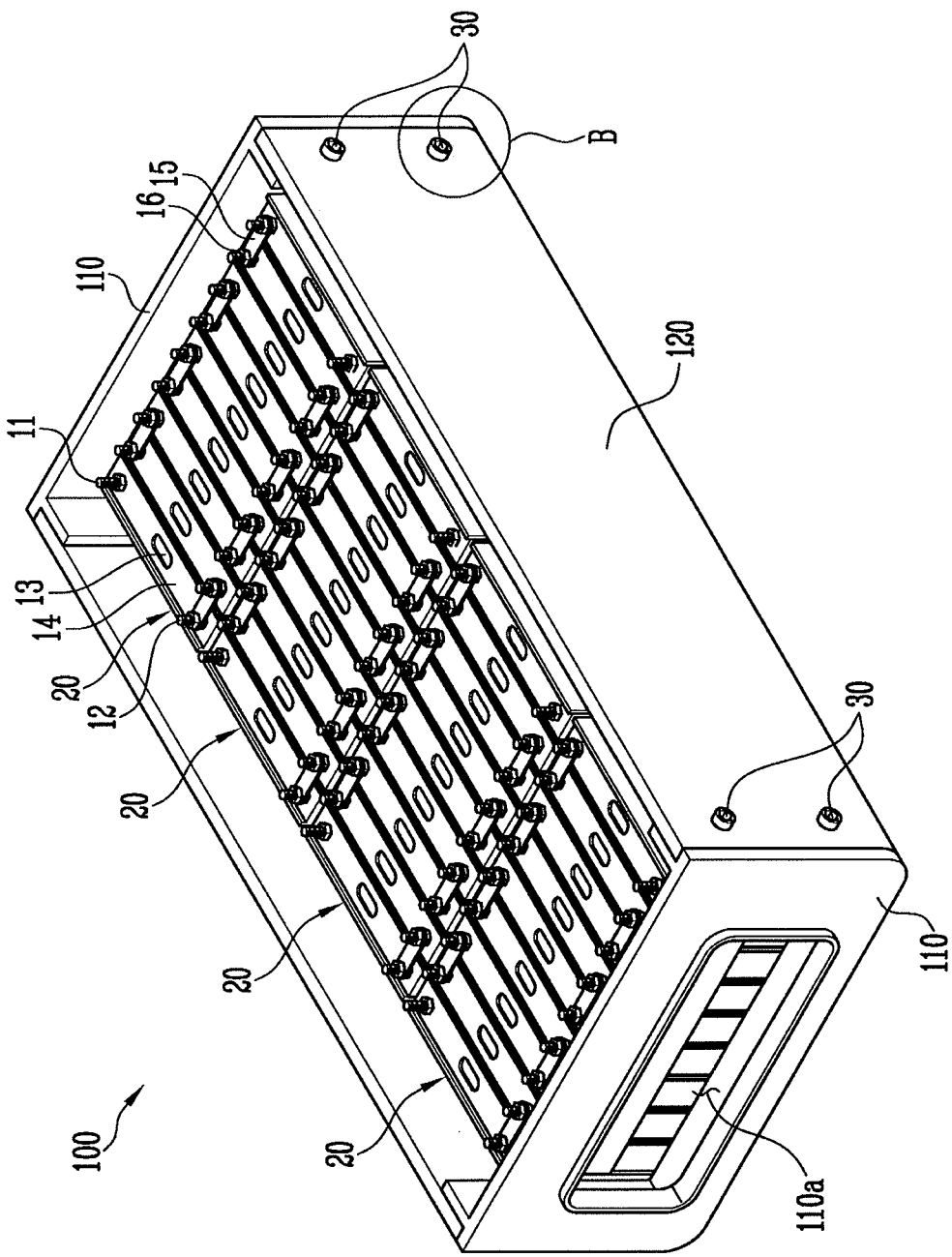
FIG. 1 illustrates a perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 2:
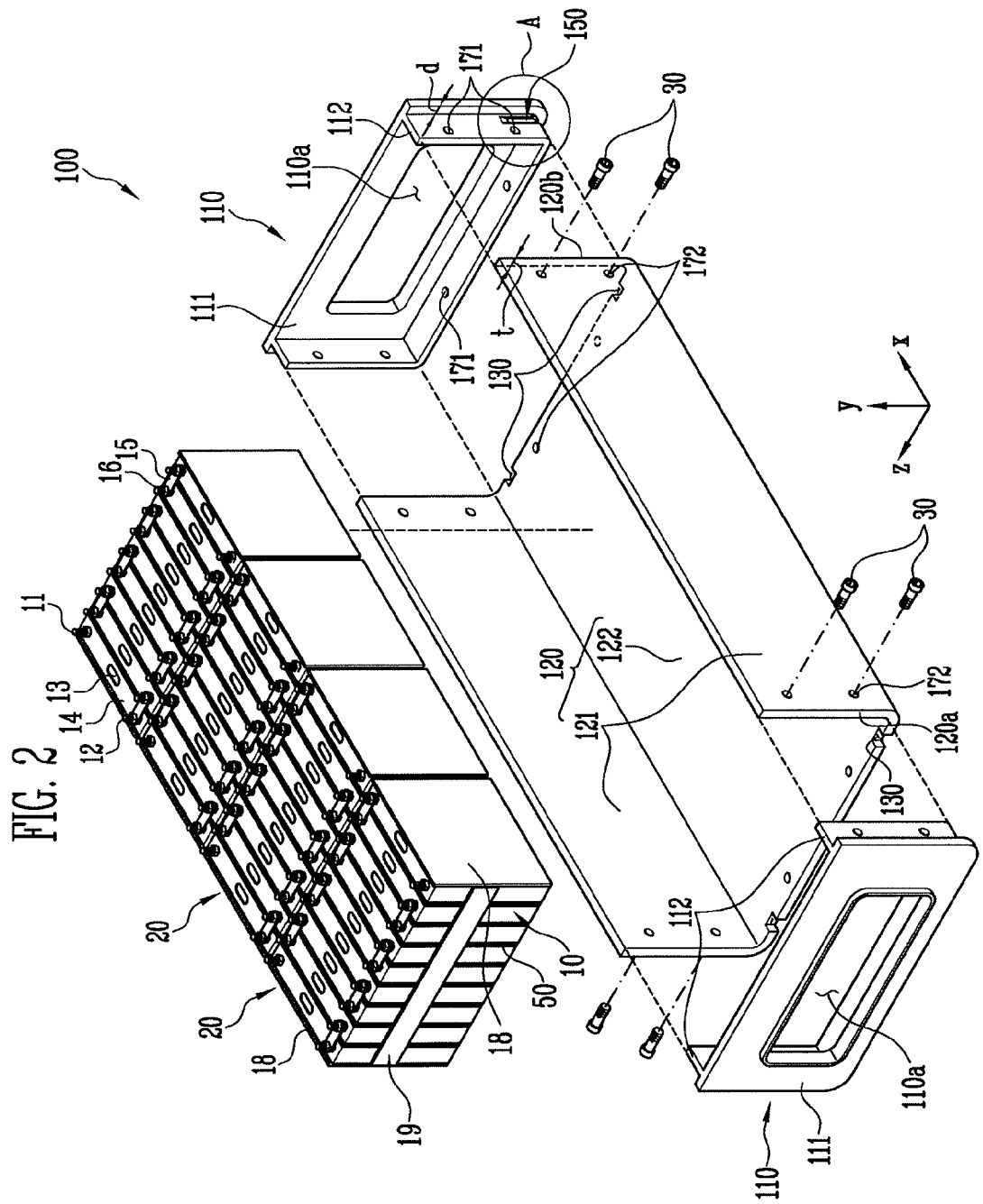
FIG. 2 illustrates an exploded perspective view of the battery pack shown in FIG. 1.

FIG. 1 illustrates a perspective view of a battery pack according to an embodiment. FIG. 2 illustrates an exploded perspective view of the battery pack shown in FIG. 1.

The battery pack 100 according to this embodiment may include a plurality of bare cells 10 electrically coupled to one another, and a housing configured to accommodate the bare cells 10 therein. The housing may include a frame portion 120 and a pair of side portions 110 respectively connected to one end 120a and the other end 120b of the frame portion 120. The housing may includes a guide portion 150 formed in an outer surface thereof for guiding the flow of a fluid. The guide portion 150 may be provided at a portion where the frame portion 120 and one of the side portions 110 are adjacent to each other. The frame portion 120 may include a pair of first frames 121 configured to face each other in a first direction, and a second frame 122 configured to connect bottoms of the pair of first frames 121. The side portions 110 may be provided to face each other in a second direction vertical to the first direction at the one end 120a and the other end 120b of the frame portion 120.

After a plurality of bare cells 10 are aligned, the plurality of battery cells 10 may be bundled using a pair of end plates 18 and a connecting member 19 for connecting the end plates 18, thereby manufacturing the bundled battery cells 10 as a battery module 20. The bare cells 10 may be provided in the form of the battery module 20 inside the housing. In addition, barriers 50 may be respectively provided between the aligned bare cells 10. The barrier 50 may allow adjacent bare cells 10 to be spaced apart from each other, thereby providing the flow path of a fluid such as a heat exchange medium. The heat exchange medium may be heat-exchanged with the bare cells 10 to control the temperature of the bare cells 10.

The bare cell 10 may be a secondary battery that can be reversibly charged/discharged. The bare cell 10 may include a battery case, and an electrode assembly and an electrolyte accommodated in the battery case. The battery case may be hermetically sealed with a cap assembly 14 having a positive electrode terminal 11, a negative electrode terminal 12 and a vent 13. The electrode assembly and the electrolyte may generate electrochemical energy through a reaction therebetween, and the generated energy may be transferred to the outside of the bare cell 10 through the positive and negative electrode terminals 11 and 12. The positive and negative electrode terminals 11 and 12 of adjacent bare cells 10 may be electrically connected through a bus-bar 15. The bus-bar 15 may be fixed to the positive and negative electrode terminals 11 and 12 of the adjacent bare cells 10 using a member such as a nut 16. The vent 13 may serve as a safety device of the bare cell 10, to act as a passage through which gas generated inside the bare cell 10 is exhausted to the outside of the bare cell 10.

The bare cells 10 manufactured in the form of the battery module 20 may be accommodated in the housing including the frame portion 120 and the side portions 110. The frame portion 120 may include the pair of first frames 121 configured to face each other in the first direction (z-direction), and the second frame 122 configured to connect the bottoms of the pair of first frames 121. For example, the section of the frame portion 120 along the first direction may be formed in a U shape. The frame portion 120 may be formed approximately in an box shape. In the box shape, an upper surface, and the one end 120a and the other end 120b of the frame portion 120, which are both side surfaces, may be opened.

The side portions 110 may be provided to face each other in the second direction vertical to the first direction at the one end 120a and the other end 120b of the frame portion 120. For example, the side portions 110 may be provided to close the open one end and the other end of the frame portion 120. Through-holes 110a acting as an inlet and an outlet of the heat exchange medium may be provided in the side portions 110, respectively. The battery module 20 may be aligned so that a side surface of the battery module 20 faces the through-hole 110a. With the side portions 110 facing each other, the heat exchange medium may flow into the battery pack 100 through the through-hole 110a of one side portion 110 to pass through a space between the bare cells 10 spaced apart from each other by the barrier 50. Subsequently, the heat exchange medium may flow out to the outside of the battery pack 100 through the through-hole 110a of the other side portion 110. The heat exchange medium may be heat-exchanged with the bare cells 10 to control the temperature of the bare cells 10. In addition, the heat exchange medium may control the heat generation of the bare cells 10, to improve the safety and reliability of the bare cells 10.

The side portion 110 may include a base portion 111 that vertically contacts the one end 120a and the other end 120b of the frame portion 120, and a flange portion 112 that protrudes toward the frame portion 120 from the base portion 111. The flange portion 112 may be spaced inwardly from an end of the base portion 111 by a first distance d. For example, the first distance d may be provided to correspond to the thickness t of the frame portion 120. The flange portion 112 of the side portion 110 may be inserted inside the frame portion 120 to overlap with the frame portion 120. The one end 120a and the other end 120b of the frame portion 120 may contact with the base portion 111. The first distance d and the thickness t of the frame portion 120 may be provided to be similar to each other. Accordingly, the frame portion 120 may be coupled to the side portion 110 without protruding beyond the ends of the side portion 110.

A first fastening portion 171 may be provided to the flange portion 112, and a second fastening portion 172 fastened to the first fastening portion 171 may be provided to the frame portion 120. The first and second fastening portions 171 and 172 may be provided at positions corresponding to each other. The first and second fastening portions 171 and 172 may be fastened by a separate fastening member 30, e.g., a bolt, stud or the like.

The battery pack 100 according to this embodiment may further include a guide portion 150. The guide portion 150 may be provided at a portion where the side portion 110 and the frame portion 120 overlap with each other. For example, the guide portion 150 may be provided in an outer surface of the flange portion 112 of the side portion 110. After the flange portion 112 is inserted inside the frame portion 120, the guide portion 150 may be interposed between the outer surface of the flange portion 112 and the inner surface of the frame portion 120.

The frame portion 120 may be made of stainless steel, and the side portion 110 may be made of plastic. The frame portion 120 is made of stainless steel, to improve the entire strength of the battery pack 100. The side portion 120, having a small area occupied in the battery pack 100, may be made of plastic. The shape of plastic is easily varied, and thus, the shape of the side portion 110 may be variously implemented.

Figure 3:
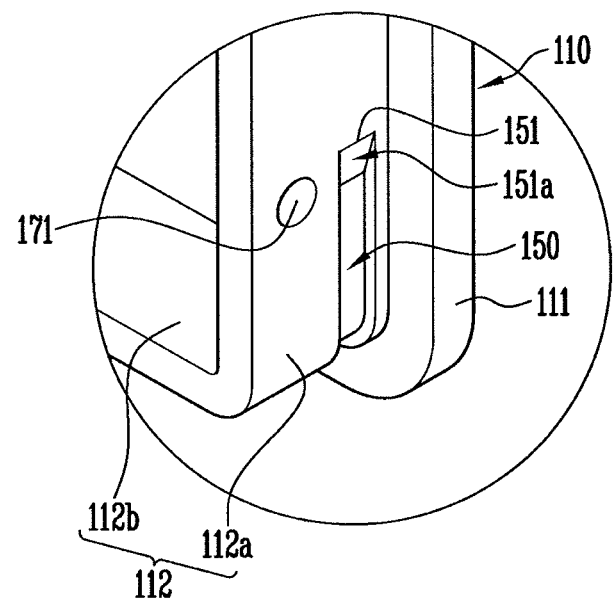
FIG. 3 illustrates an enlarged view of portion A of FIG. 2.
Figure 4:
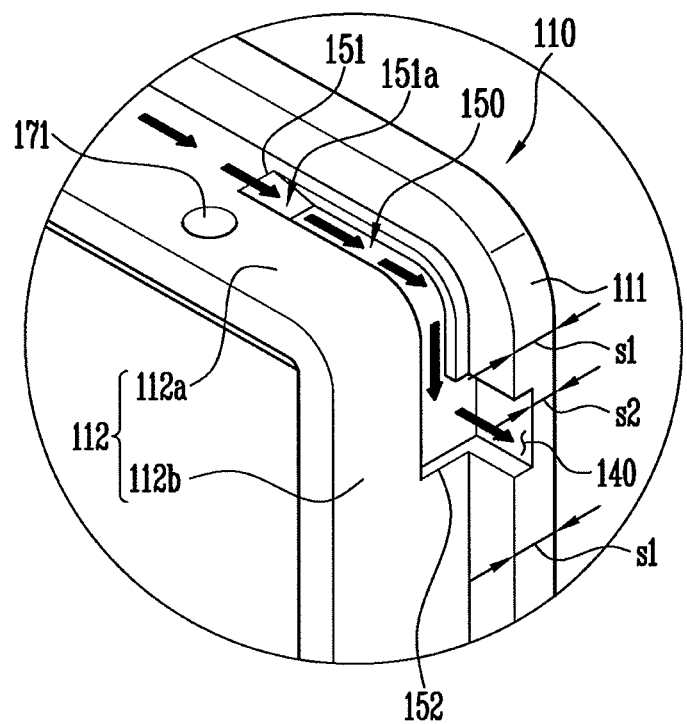
FIG. 4 illustrates a rotated, enlarged view showing a lower side of FIG. 3.
Figure 5:
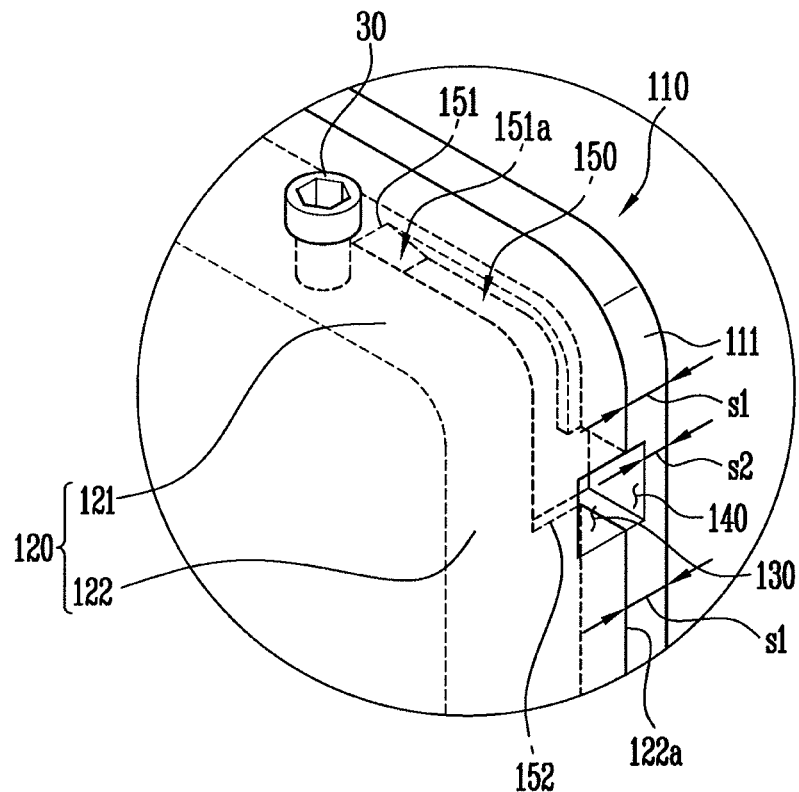
FIG. 5 illustrates a rotated, enlarged view schematically showing a state in which a frame portion is provided at the lower side of FIG. 3.
Figure 6:
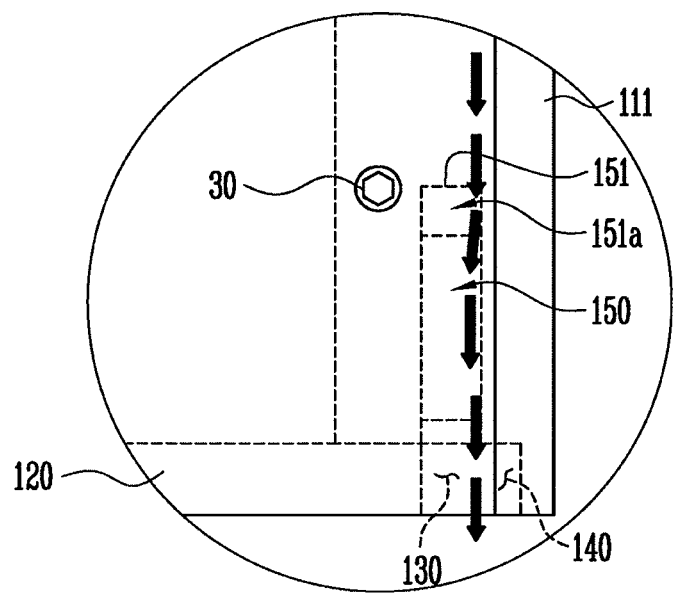
FIG. 6 illustrates an enlarged view showing portion B of FIG. 1.

FIG. 3 illustrates an enlarged view of portion A of FIG. 2. FIG. 4 illustrates a rotated, enlarged view showing a lower side of FIG. 3. FIG. 5 illustrates a rotated enlarged view schematically showing a state in which a frame portion is provided at the lower side of FIG. 3. FIG. 6 illustrates an enlarged view showing portion B of FIG. 1.

Referring to FIGS. 3 to 5, the guide portion 150 may be provided in the flange portion 112. The guide portion 150 may be provided adjacent to an end portion of the frame portion 120. The guide portion 150 may include a groove portion that is inwardly recessed.

The frame portion 120 may include a pair of first frames 121 configured to face each other at both sides thereof, and a second frame 122 configured to connect the pair of first frames 121. The flange portion 112 may include first and second flanges 112a and 112b that respectively contact the first and second frames 121 and 122. The guide portion 150 may be provided to extend to the second flange 112b at a lower portion of a bottom of the first flange 112a. The guide portion 150 may be provided such that at least one end of the guide portion 150 is sloped.

The guide portion 150 may be provided to extend from the first flange 112a to the second flange 112b. The first flange 112a may include a first end portion 151 and the second flange 112b may include a second end portion 152. The guide portion 150 may be provided to extend from the first end portion 151 to the second end portion 152. The guide portion 150 may be provided to be recessed inwardly from outer surfaces of the first and second flanges 112a and 112b. In this case, the section vertical to the first end portion 151 may include a slope portion 151a provided to slope inwardly from the outer surface of the first flange 112a. The guide portion 150 may be recessed via the slope portion 151 to gradually have the shape of a diagonal line from the outer surface of the first flange 112a at the beginning of the first end portion 151.

The base portion 111 contacts the second frame 122. The base portion 111 may include a groove portion 140 such that the base portion 111 at the groove portion 140 has a thickness that is thinner than a thickness of a peripheral portion, such that the base portion 111 at the groove portion is spaced apart from a portion of the second frame 122. For example, the thickness s2 of the base portion 111 at the groove portion 140 may be formed thinner than the thickness s1 of the peripheral portion of the base portion 111. The groove portion 140 may be connected to the guide portion 150. For example, the guide portion 150 and the groove portion 140 may be provided to extend to each other so that the second end portion 152 of the guide portion 150 and the end portion of the groove portion 140 are parallel to each other.

The frame portion 120 may further include a portion provided to be recessed inward from the end thereof. For example, the second frame 122 may further include a stepped portion 130 provided at an end portion of the second frame 122 to be recessed lower than a peripheral portion of the second frame. The stepped portion 130 may be provided to correspond to the groove portion 140. In addition, the stepped portion 130 may correspond to the second end portion 152 of the guide portion 150.

As a battery pack is used, condensation water such as water drops may be formed on an outer surface of the battery pack, or cooling water or the like may be sprayed onto the outer surface of the battery pack in order to perform a heat exchange with the battery pack. Moisture may penetrate into a portion where the frame portion 120 and the side portion 110 contact each other and may not be drained but instead may pool. Such moisture may cause the frame portion 120 formed of the stainless steel to be rusted. In a serious case, the moisture may cause a short-circuit with the bare cell. The guide portion according to embodiments may be provided in the battery pack to drain such moisture before damage may occur.

Referring to FIG. 6, moisture or the like may flow downward at the portion where the side portion 110 and the frame portion 120 are contacted with each other, and then pool in the guide portion 150 provided in the flange portion 112 of the side portion 110. In this case, the first end portion 151 of the guide portion 151 includes the slope portion 151a, and thus the flow of the moisture may be guided along the slope portion 151a at the first end portion 151. In addition, the moisture may flow toward a lower side of the battery pack along the guide portion 150. The moisture may be drained to the outside of the battery pack from the lower side. In this case, the groove portion 140 may be provided in the base portion 111 to be adjacent to the second end portion 152, and thus the discharge of the moisture can be easily performed. Further, the stepped portion 130 provided to the frame portion 120 may expand the discharge path of the moisture, and thus the discharge of the moisture may be more easily performed. Accordingly, the discharge of the moisture may be accelerated by guiding the flow of the moisture that penetrates into the portion where the frame portion 120 and the side portion 110 contact each other, so that it may be possible to increase the lifespan of the battery pack.

Hereinafter, other embodiments will be described with reference to FIGS. 7 to 10. Contents of these embodiments, except the following contents, are similar to those of the embodiment described with reference to FIGS. 1 to 6, and therefore, a detailed description of similar features will not be repeated.

Figure 7:
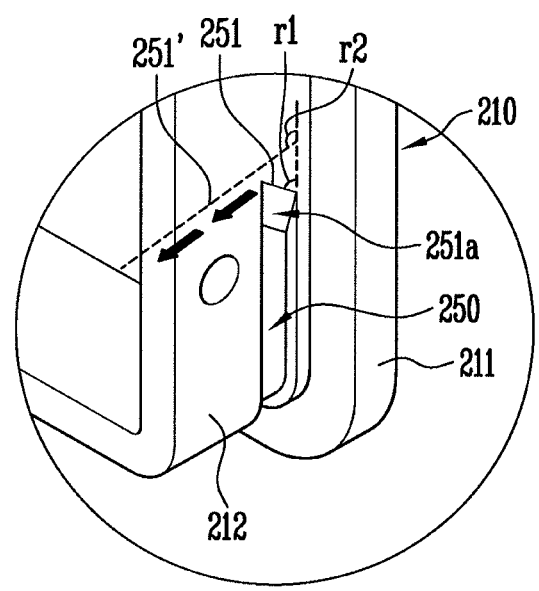
FIG. 7 illustrates an enlarged view schematically showing a side portion in a battery pack according to another embodiment.

FIG. 7 illustrates an enlarged view schematically showing a side portion in a battery pack according to another embodiment.

Referring to FIG. 7, the side portion 210 according to this embodiment may include a base portion 211 and a flange portion 212. The flange portion 212 may be inserted inside a frame portion, to overlap with an inner surface of the frame portion. In this case, a guide portion 250 capable of guiding the flow of fluid such as moisture may be provided in an outer surface of the flange portion 212.

A first end portion 251, which is one end of the guide portion 250, may be formed as a diagonal surface having an angle r1 of less than 90 degrees counterclockwise with respect to the base portion 211. The flow of moisture that penetrates into a portion where the side portion 210 and the frame portion contact each other may be guided by the guide portion 250 to flow downward. In this case, the first end portion 251 of the guide portion 250 may be formed as the diagonal surface having the angle r1 of less than 90 degrees, such that the flow of the penetrated moisture may be controlled by the direction of the diagonal surface. For example, the flow of the penetrated moisture may be blocked by the diagonal surface of the first end portion 251, and thus the direction of the flow may be controlled such that the moisture does not penetrate into a deep portion inside the frame portion. On the other hand, if the first end portion 251 were to be formed as a diagonal surface 251' having an angle r2 of over 90 degrees, the flow of the penetrated moisture may be guided along the diagonal surface 251' having the angle r2 of over 90 degrees in the direction of the arrow shown in FIG. 7. Therefore, the penetrated moisture may not be discharged but may flow inside the frame portion. Accordingly, in the battery pack according to this embodiment, the first end portion 251 of the guide portion 250 may be formed as a diagonal surface having an angle r1 of less than 90 degrees counterclockwise with respect to the base portion 211.

Figure 8:
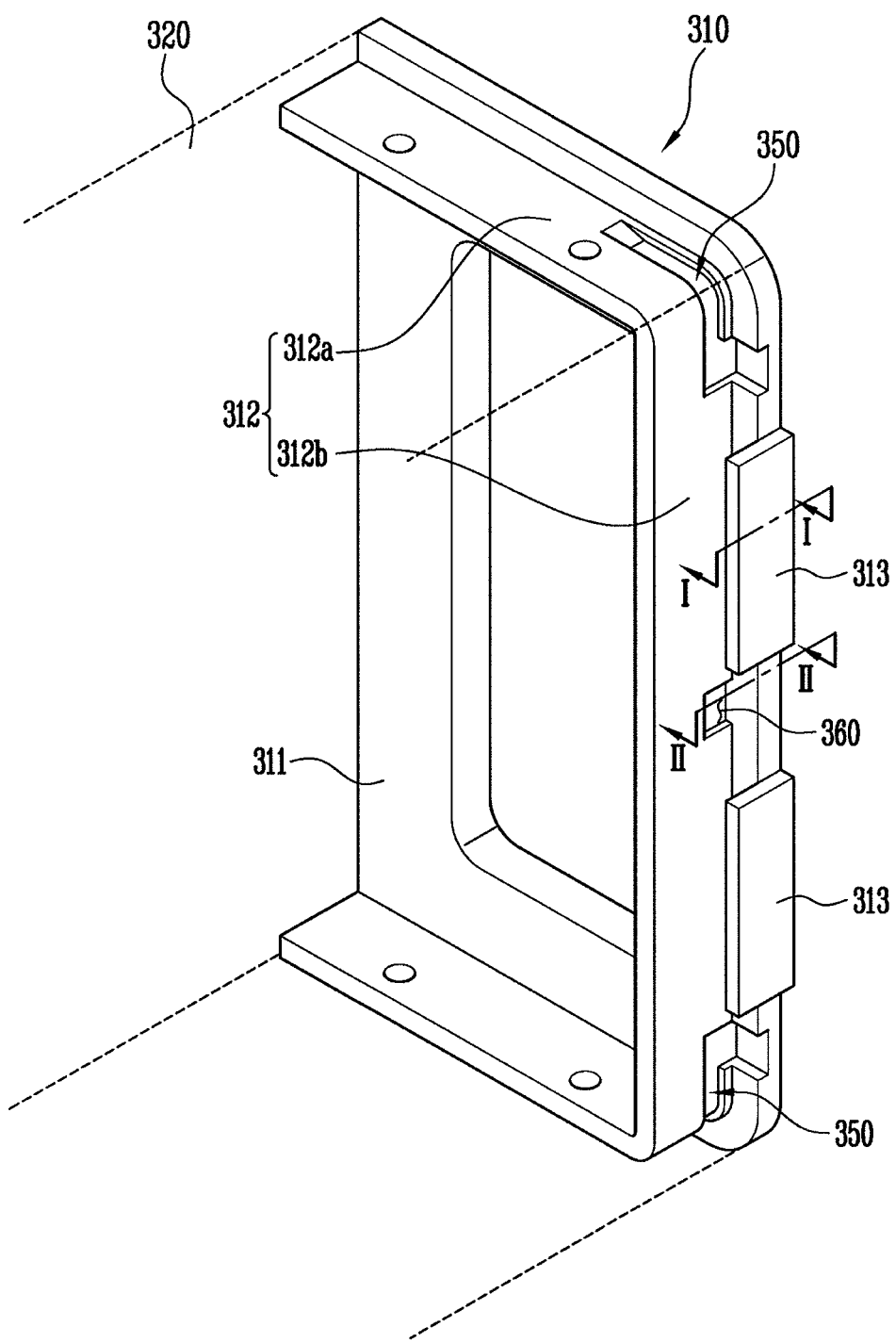
FIG. 8 illustrates a rotated, perspective view of a side portion in a battery pack according to still another embodiment.
Figure 9:
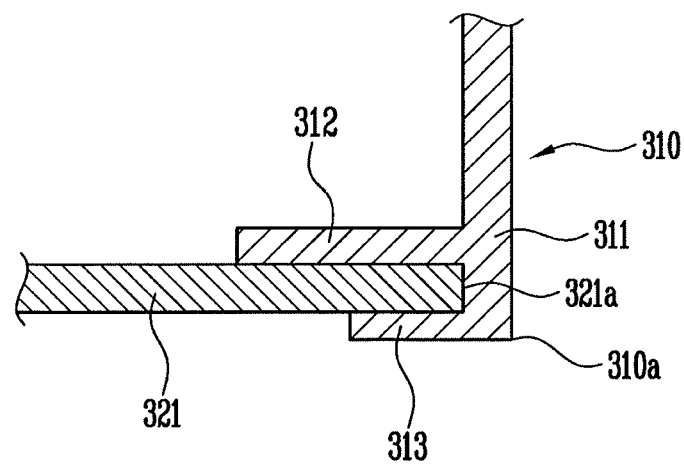
FIG. 9 illustrates a sectional view taken along line I-I of FIG. 8.
Figure 10:
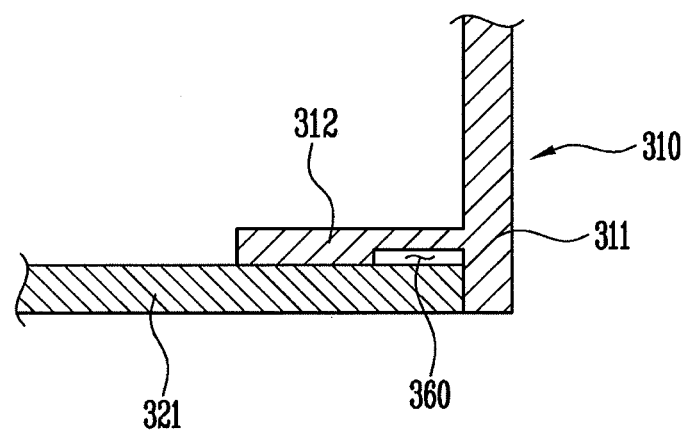
FIG. 10 illustrates a sectional view taken along line II-II of FIG. 8.

FIG. 8 illustrates a perspective view of a side portion in a battery pack according to another embodiment. FIG. 9 illustrates a sectional view taken along line I-I of FIG. 8. FIG. 10 illustrates a sectional view taken along line II-II of FIG. 8.

Referring to FIGS. 8 to 10, in the battery pack according to this embodiment, a side portion 310 and a frame portion 320 may be connected to each other. The side portion 310 may include a guide portion 350 provided at a portion where the side portion 310 and the frame portion 320 overlap with each other. The side portion 310 may include a base portion 311, and a flange portion 312 that protrudes vertical to the base portion 311, to overlap with an inner surface of the frame portion 320. The frame portion 320 may include a pair of first frames provided to face each other, and a second frame 322 provided to extend between the pair of first frames.

The side portion 310 may further include one or more support portions 313 provided to the outer surface of the second frame 322. In this case, the flange portion 312 may be connected to the base portion 311, and may be spaced apart from an end 310a of the base portion 311 by a first distance. The support portion 313 may protrude outwardly from the end 310a of the base portion 311, to extend parallel to the flange portion 312.

Referring to FIG. 9, a space may be provided between the flange portion 312 and the support portion 313, which are provided in parallel to each other. The second frame 321 may be inserted between the flange portion 312 and the support portion 313, and thus an end 321a of the second frame 321 may contact the base portion 311. The support portion 313 may fix a lower portion of the frame portion 320 and simultaneously may support the weight of the frame portion 320. Thus, the side portion 310 and the frame portion 320 may be firmly fixed by the support portion 313.

Referring to FIG. 10, the support portion 313 may be configured with two support portions 313 provided to be spaced apart from each other, based on the center of the second frame 321. The housing may further include a bottom guide portion 360 provided between the two support portions 313 to guide the flow of fluid. The bottom guide portion 360 is interposed between the second frame 322 and the support portion 313, to be provided as an empty space. The flow of moisture that penetrates between the second frame 321 and the support portion 313 may be easily guided to the bottom guide portion 360. Accordingly, the discharge of the moisture at a lower side in the battery pack can be further accelerated.

By way of summation and review, a lightweight battery pack generating high power and having improved electrochemical stability is desirable. Embodiments provide a battery pack having a housing that has a drainage structure, thereby improving the lifespan of the battery pack and avoiding damage that could be caused by pooled moisture.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A battery pack, comprising:
   a plurality of bare cells electrically connected to one another; and
   a housing that accommodates the bare cells therein, the housing including a frame portion and a pair of side portions respectively connected to one end and the other end of the frame portion, wherein:
   the housing includes a guide portion to guide a flow of fluid, the guide portion being located where the one end of the frame portion and one side portion of the pair of side portions are adjacent to each other, the guide portion having an open vertical section interposed between the frame portion and a sidewall of the one side portion, and
   the guide portion includes a groove portion that is inwardly recessed, the guide portion extending only through a portion of a thickness of the one side portion.

2. The battery pack as claimed in claim 1, wherein:
   the frame portion includes a pair of first frames that face each other in a first direction, and a second frame that connects bottoms of the pair of first frames,
   the side portions face each other in a second direction perpendicular to the first direction at the one end and the other end of the frame portion, and
   the open vertical section of the guide portion extends in a third direction perpendicular to the first and second directions.

3. The battery pack as claimed in claim 2, wherein a section of the frame portion along the first direction is in a form of a U shape.

4. The battery pack as claimed in claim 2, wherein the one side portion includes a base portion that vertically contacts the one end of the frame portion, and a flange portion that protrudes toward the frame portion from the base portion.

5. The battery pack as claimed in claim 4, wherein the flange portion is inwardly spaced from an end of the base portion by a first distance.

6. The battery pack as claimed in claim 5, wherein the first distance corresponds to a thickness of the frame portion.

7. The battery pack as claimed in claim 4, wherein:
   the flange portion is insertably coupled to an inside of the frame portion to overlap with the frame portion such that the flange portion is interposed between the frame portion and the bare cells, and
   the guide portion is located where the side portion and the frame portion overlap with each other.

8. The battery pack as claimed in claim 4, wherein:
the flange portion includes a first fastening portion, and
the frame portion includes a second fastening portion fastened to the first fastening portion.

9. The battery pack as claimed in claim 4, wherein the guide portion is located in the flange portion adjacent to the one end of the frame portion.

10. The battery pack as claimed in claim 4, wherein:
the flange portion includes first and second flanges that respectively contact the first frames and the second frame,
the guide portion extends to the second flange at a lower portion of the first flange, and
at least one end of the guide portion is sloped.

11. The battery pack as claimed in claim 10, wherein:
a first end portion of the guide portion is located at the first flange and a second end portion of the guide portion is located at the second flange, the first end portion of the guide portion and the second end portion of the guide portion extending to each other,
the guide portion is inwardly recessed from an outer surface of the first flange, and
a section of the guide portion perpendicular to the first end portion of the guide portion slopes inwardly from the outer surface of the first flange.

12. The battery pack as claimed in claim 11, wherein the first end portion is in a form of a diagonal surface having an angle of less than 90 degrees counterclockwise with respect to the base portion.

13. The battery pack as claimed in claim 4, wherein the base portion of the one side portion further includes a groove portion that contacts the second frame, the base portion where the groove portion is located having a thickness less than that of a peripheral portion of the base portion such that the base portion where the groove portion is located is spaced apart from the second frame.

14. The battery pack as claimed in claim 13, wherein the groove portion is connected to the guide portion.

15. The battery pack as claimed in claim 13, wherein the second frame further includes a stepped portion located at an end portion thereof, the stepped portion of the second frame being stepped inwardly from a peripheral portion of the second frame, the stepped portion of the second frame corresponding to the groove portion of the base portion of the side portion.

16. The battery pack as claimed in claim 4, wherein:
at least one support portion overlaps an outer surface of the second frame at a bottom end of the base portion,
the second frame is inserted between the flange portion and the support portion,
the support portion includes two support portions that are spaced apart from each other, relative to the center of the second frame, and
the housing further includes a bottom guide portion between the two support portions.

17. The battery pack as claimed in claim 1, wherein:
the frame portion is made of stainless steel, and
the side portions are made of plastic.

18. A battery pack, comprising:
a plurality of bare cells electrically connected to one another; and
a housing that accommodates the bare cells therein, the housing including a frame portion and a pair of side portions respectively connected to one end and the other end of the frame portion,
wherein:
the housing includes a guide portion to guide a flow of fluid, the guide portion being located where the one end of the frame portion and one side portion of the pair of side portions are adjacent to each other,
the frame portion includes a pair of first frames that face each other in a first direction, and a second frame that connects bottoms of the pair of first frames,
the side portions face each other in a second direction perpendicular to the first direction at the one end and the other end of the frame portion,
the one side portion includes a base portion that vertically contacts the one end of the frame portion, and a flange portion that protrudes toward the frame portion from the base portion,
the flange portion includes first and second flanges that respectively contact the first frames and the second frame,
the guide portion extends to the second flange at a lower portion of the first flange,
the guide portion includes a groove portion in the first flange and the second flange, the groove portion having an open vertical section interposed between the frame portion and a sidewall of the one side portion, and
the groove portion of the guide portion is inwardly recessed, the guide portion extending only through a portion of a thickness of the one side portion.

19. A battery pack, comprising:
a plurality of bare cells electrically connected to one another; and
a housing that accommodates the bare cells therein, the housing including a frame portion and a pair of side portions respectively connected to one end and the other end of the frame portion,
wherein:
the housing includes a guide portion to guide a flow of fluid, the guide portion being located where the one end of the frame portion and one side portion of the pair of side portions are adjacent to each other,
the frame portion includes a pair of first frames that face each other in a first direction, and a second frame that connects bottoms of the pair of first frames,
the side portions face each other in a second direction perpendicular to the first direction at the one end and the other end of the frame portion,
the one side portion includes a base portion that vertically contacts the one end of the frame portion, and a flange portion that protrudes toward the frame portion from the base portion,
the flange portion includes a first fastening portion,
the frame portion includes a second fastening portion,
the first and second fastening portions are fastened to each other by a separate fastening member,
the guide portion has an open vertical section interposed between the frame portion and a sidewall of the one side portion, and
the guide portion includes a groove portion that is inwardly recessed, the guide portion not extending through an entirety of a thickness of the one side portion.

* * * * *